United States Patent
Wiest et al.

(10) Patent No.: US 10,152,595 B2
(45) Date of Patent: Dec. 11, 2018

(54) CONTAINER AND IMAGE SCANNING FOR A PLATFORM-AS-A-SERVICE SYSTEM

(71) Applicant: Red Hat, Inc., Raleigh, NC (US)

(72) Inventors: Thomas Wiest, Lehi, UT (US); Joel Smith, Orem, UT (US)

(73) Assignee: Red Hat, Inc., Raleigh, NC (US)

(*) Notice: Subject to any disclaimer, the term of this patent is extended or adjusted under 35 U.S.C. 154(b) by 358 days.

(21) Appl. No.: 15/167,157

(22) Filed: May 27, 2016

(65) Prior Publication Data

US 2016/0275287 A1    Sep. 22, 2016

Related U.S. Application Data

(63) Continuation of application No. 14/605,019, filed on Jan. 26, 2015, now Pat. No. 9,355,248.

(51) Int. Cl.
| | |
|---|---|
| *G06F 21/55* | (2013.01) |
| *G06F 21/56* | (2013.01) |
| *G06F 9/455* | (2018.01) |
| *H04L 29/06* | (2006.01) |
| *G06F 8/60* | (2018.01) |

(52) U.S. Cl.
CPC ............ *G06F 21/562* (2013.01); *G06F 9/455* (2013.01); *G06F 9/45558* (2013.01); *G06F 21/55* (2013.01); *H04L 63/1441* (2013.01); *G06F 8/60* (2013.01); *G06F 2009/45562* (2013.01); *G06F 2009/45575* (2013.01)

(58) Field of Classification Search
CPC ........ G06F 21/55; G06F 21/562; G06F 9/455; G06F 9/45558; G06F 2009/45562; G06F 2009/45575; H04L 63/1441
See application file for complete search history.

(56) References Cited

U.S. PATENT DOCUMENTS

| | | | |
|---|---|---|---|
| 7,540,027 B2 | 5/2009 | Achanta et al. | |
| 7,581,253 B2 | 8/2009 | Challener et al. | |
| 7,640,587 B2 | 12/2009 | Fox et al. | |
| 8,011,010 B2 | 8/2011 | Michael et al. | |

(Continued)

OTHER PUBLICATIONS

USPTO, Notice of Allowance for U.S. Appl. No. 14/605,019 (L1871), dated Feb. 1, 2016.

(Continued)

*Primary Examiner* — Beemnet W Dada

(74) *Attorney, Agent, or Firm* — Lowenstein Sandler LLP

(57) ABSTRACT

A method of container and image scanning includes storing at a central scan store of a multi-tenant system, an image scan result for a container image, the container image for executing functionality of applications and comprising layers, wherein the image scan result generated by a scan process comprising scanning a top layer of the container image, the remaining layers of the container image are immutable, verifying a clean status of the remaining layers of the container image with the central scan store, and transmitting the image scan result for the container image, the image scan result being clean in response to a clean result returned for the scanning and successful verification of the clean status of the remaining layers. The method further includes responsive to receiving a container image scan result request for the container image, transmitting the image scan result for the container image.

20 Claims, 6 Drawing Sheets

(56) References Cited

U.S. PATENT DOCUMENTS

| | | | |
|---|---|---|---|
| 8,034,640 B2* | 10/2011 | Shin | H01J 37/241 |
| | | | 257/E21.53 |
| 8,528,075 B2 | 9/2013 | Heim et al. | |
| 8,615,737 B2 | 12/2013 | Walsh et al. | |
| 2006/0230454 A1 | 10/2006 | Achanta | |
| 2009/0158432 A1 | 6/2009 | Zheng | |
| 2012/0224694 A1 | 9/2012 | Lu | |
| 2015/0081834 A1 | 3/2015 | Naito | |

OTHER PUBLICATIONS

Lukan, Dejan, "Securing Cloud-Based Applications with Docker", http://resources.infosecinstitute.com/securing-cloud-based-applications-docker/, Feb. 25, 2014, 11 pages.

Walsh, Daniel J., "Are Docker containers Really Secure?", http://opensource.com/business/14/7/docker-security-selinux, Jul. 22, 2014, 9 pages.

Yegulalp, Serdar, "Docker 1.3 Tightens Container Security with Digital Signatures", http://www.infoworld.com/article/2835155/application-virtualization/docker-13-uses-digital-signatures-to-amp-up-container-security.html, Oct. 17, 2014, 4 pages.

Petazzoni, Jerome, "Linux Containers (LXC), Docker, and Security", http://www.slideshare.net/jpetazzo/linux-containers-lxc-docker-and-security, Jan. 31, 2014, 11 pages.

Hacker News, "Docker Container Breakout?", https://news.ycombinator.com/item?id=7909622, [retrieved from the internet on Jan. 29, 2015], 13 pages.

\* cited by examiner

CONTAINER AND IMAGE SCANNING FOR A PLATFORM-AS-A-SERVICE SYSTEM

REFERENCE TO RELATED APPLICATION

This application is a continuation of and claims the benefit under 35 U.S.C. § 120 of U.S. patent application Ser. No. 14/605,019, filed on Jan. 26, 2015, the entirety of which is incorporated herein by reference.

TECHNICAL FIELD

The implementations of the disclosure relate generally to Platform-as-a-Service (PaaS) systems and, more specifically, relate to container and image scanning for a PaaS system.

BACKGROUND

A variety of Platform-as-a-Service (PaaS) system offerings exists that include software and/or hardware facilities for facilitating the execution of web applications in a cloud-computing environment (the "cloud"). Cloud computing is a computing paradigm in which a customer pays a "cloud provider" to execute a program on computer hardware owned and/or controlled by the cloud provider. It is common for cloud providers to make virtual machines (VMs) hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings facilitate deployment of web applications without the cost and complexity of buying and managing the underlying hardware and software and provisioning hosting capabilities, providing the facilities to support the complete life cycle of building and delivering web applications and services entirely available from the Internet. Typically, these facilities operate as one or more VMs running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
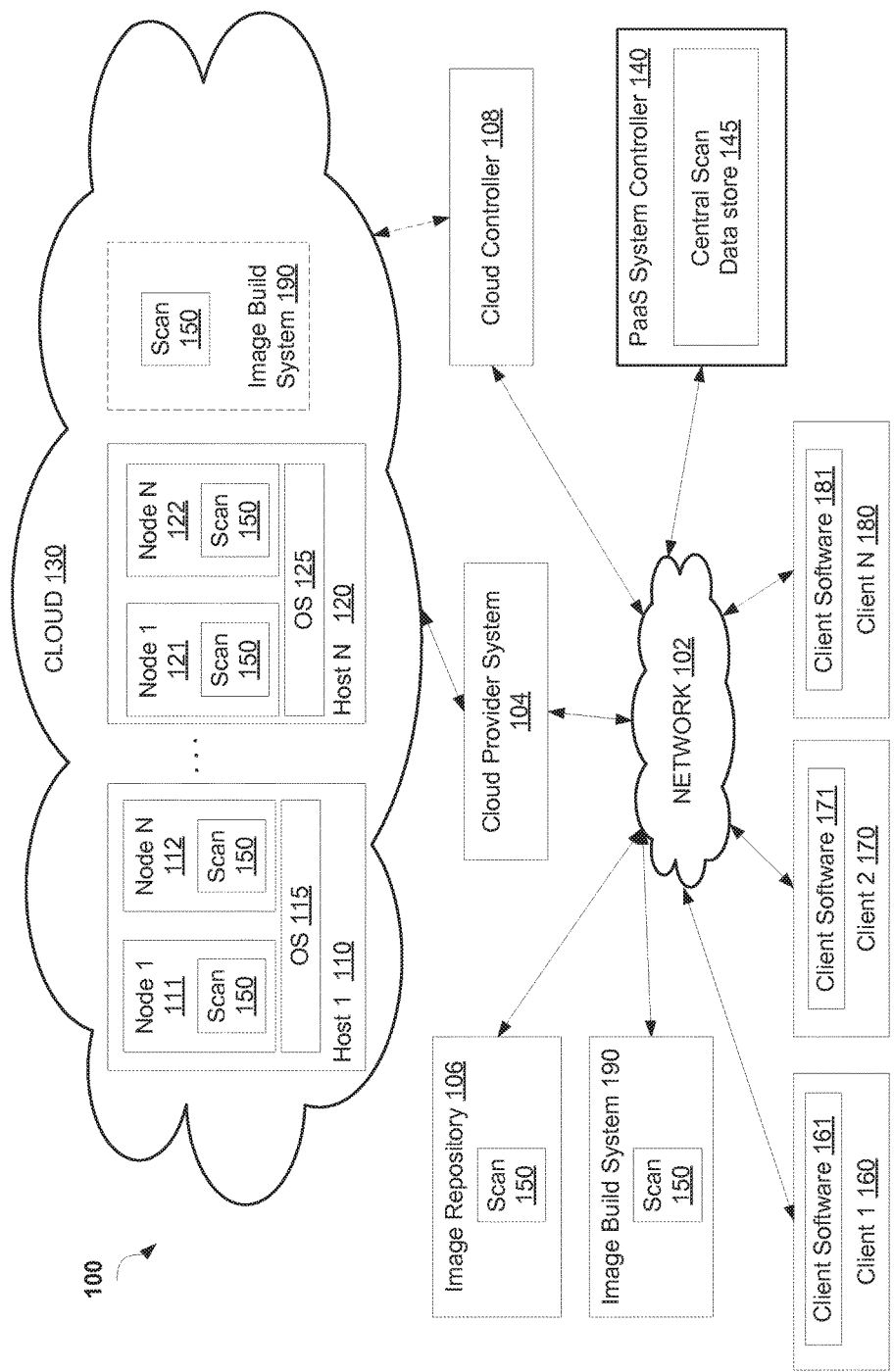
FIG. 1 is a block diagram of a network architecture in which implementations of the disclosure may operate.

Implementations of the disclosure provide container and image scanning for a Platform-as-a-Service (PaaS) system. Implementations provide scan components located at multiple locations in the PaaS system, including at nodes, at an image repository, and at an image build system. The scan components may include one or more pluggable scanning processes installed to provide pattern detection in order to identify threats (e.g., viruses, malware, other unwanted processes, etc.) existing in the PaaS system. Implementations of the disclosure optimize scanning performed by scan component of images and runtime environments of applications of the PaaS. The multiple scan components are distributed throughout the PaaS system to provide for separate build-time, runtime and image repository scans.

The multiple scan components are optimized to take advantage of the image-based model for application deployment utilized by the PaaS. Full application image scans may be performed by a scan component residing at the image build system. Each time an application image is built, scan component analyzes the output of the build to determine whether the application image is clean. A result of the built application image scan process is stored in a central scan data store maintained by the PaaS system controller. Similarly, when new scan definitions are released, a scan component residing in the image repository scans all existing application images and updates central scan data store with the results.

Furthermore, scan components at each node in the system are configured to scan the running (e.g., top-most) layer of each application image instance on the node, while ignoring all other layers of the application image. Each application image includes multiple layers of files, with the top-most layer of an application image instance running in a node being configurable, while the remaining lower layer are immutable or unchangeable. As a result of running a scan of the built application image at build-time, the lower layer of an application image instance running on a node is assumed to be clean in terms of scanning. Consequently, the scan components at nodes scan just the top-most configurable layer of the running application components on the node, thus saving resources in the PaaS system that were previously consumed in running full image scans at the nodes.

Previous solutions for providing image and container scanning for a PaaS system would run scans on entire images and application files maintained at the nodes in the PaaS system. Even when the previous scanning solutions provided for scanning of those application files that had not been modified or had been scanned recently, the previous solutions still had to perform full system scans of the application files at the nodes periodically to ensure security of the PaaS system. Implementations of the disclosure provide for efficient and optimized scanning of application images in a PaaS system by scanning a portion of an application image at a node without having to perform a full scan of the application image at any point in time at the node, thus conserving and reducing PaaS system resource usage.

FIG. 1 is a block diagram of a network architecture 100 in which implementations of the disclosure may operate. The network architecture 100 includes a cloud 130 managed by a cloud provider system 104. The cloud provider system 104 provides nodes 111, 112, 121, 122 to execute software and/or other processes. In some implementations these nodes are virtual machines (VMs) that are hosted on a physical machine, such as host 1 110 through host N 120, configured as part of the cloud 130. In some implementations, the host machines 110, 120 are often located in a data center. For example, nodes 111 and 112 are hosted on physical machine 110 in cloud 130 provided by cloud provider 104. When nodes 111, 112, 121, 122 are implemented as VMs, they may be executed by OSes 115, 125 on each host machine 110, 120.

In some implementations, the host machines 110, 120 are often located in a data center. Users can interact with applications executing on the cloud-based nodes 111, 112, 121, 122 using client computer systems, such as clients 160, 170 and 180, via corresponding client software 161, 171, 181. Client software 161, 171, 181 may include an application such as a web browser. In other implementations, the applications may be hosted directly on hosts 1 through N 110, 120 without the use of VMs (e.g., a "bare metal" implementation), and in such an implementation, the hosts themselves are referred to as "nodes".

Clients 160, 170, and 180 are connected to hosts 110, 120 in cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS system controller 140. Based on these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data may be used for the execution of applications for a multi-tenant PaaS system managed by the PaaS provider controller 140.

In one implementation, the data used for execution of applications includes application images built from preexisting application components and source code of users managing the application. As discussed above, an image refers to data representing executables and files of the application used to deploy functionality for a runtime instance of the application. In one implementation, the image is built using a Docker™ tool, and is referred to as a Docker image. An application image may be built in the PaaS system using an image build system 190 of the PaaS system. The image build system 190 may be provided on components hosted by cloud 130, on a server device external to the cloud 130, or even run on nodes 111, 112, 121, 122 (not shown). The image build system 190 generates an application image for an application by combining preexisting ready-to-run application image corresponding to core functional components of the application (e.g., a web framework, database, etc.) with source code specific to the application provided by the user. The resulting application image may be pushed to image repository 106 for subsequent use in launching instances of the application images for execution in the PaaS system.

Upon receiving a command identifying specific data (e.g., application data and files, such as application images, used to initialize an application on the cloud) from the PaaS provider controller 140, the cloud provider 104 retrieves the corresponding data from the image repository 106, creates an instance of it, and loads it to the hosts 110, 120 to run on nodes 111, 112, 121, 122. In addition, a command may identify specific data to be executed on one or more of the nodes 111, 112, 121, and 122. The command may be received from the cloud controller 108, from the PaaS system controller 140, or a user (e.g., a system administrator) via a console computer or a client machine. The image repository 106 may be local or remote and may represent a single data structure or multiple data structures (databases, repositories, files, etc.) residing on one or more mass storage devices, such as magnetic or optical storage based discs, solid-state-drives (SSDs) or hard drives.

In one implementation, multiple scan components 150 are located at nodes 111, 112, 121, 122, image repository 106, and an image build system 190. Scan component 150 may include one or more pluggable scanning processes installed to provide pattern detection in order to identify threats (e.g., viruses, malware, other unwanted processes, etc.) existing in the PaaS system. Implementations of the disclosure optimize scanning performed by scan component 150 of images and runtime environments of applications of the PaaS. Multiple scan components 150 are distributed throughout the PaaS system to provide for separate build-time, runtime and image repository scans. The multiple scan components 150 are optimized to take advantage of the image-based model for application deployment utilized by the PaaS. Full application image scans may be performed by a scan component 150 residing at the image build system 190. Each time an application image is built, scan component 150 analyzes the output of the build to determine whether the application image is clean. A result of the built application image scan process is stored in a central scan data store 145 maintained by the PaaS system controller 140. Similarly, when new scan definitions are released, a scan component 150 residing in the image repository scans all existing application images and updates central scan data store 145 with the results.

Scan components 150 at each of nodes 111, 112, 121, 122 are configured to scan the running (e.g., top-most) layer of each application image instance on the node 111, 112, 121, 122, while ignoring all other layers of the application image. Each application image includes multiple layers of files, with the top-most layer of an application image instance running in a node 111, 112, 121, 122 being configurable, while the remaining lower layer are immutable or unchangeable. As a result of running a scan of the built application image at build-time, the lower layers of an application image instance running on a node are assumed to be clean in terms of scanning. Consequently, the scan components 150 at nodes 111, 112, 121, 122 scan just the top-most configurable layer of running application components on the node 111, 112, 121, 22, thus saving resources in the PaaS system that were previously consumed in running full image scans at the nodes 111, 112, 121, 122. Further details of scan components 150 and its related workflows can be found below with respect to FIGS. 2 through 5.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on nodes 111, 112, 121, 122. In some implementations, an environment other than a VM may be used to execute functionality of PaaS applications. As such, in some implementations, a "node" providing computing functionality may provide the execution environment for an application of the PaaS system. The "node" may refer to a VM or any other type of computing environment.

Figure 2:
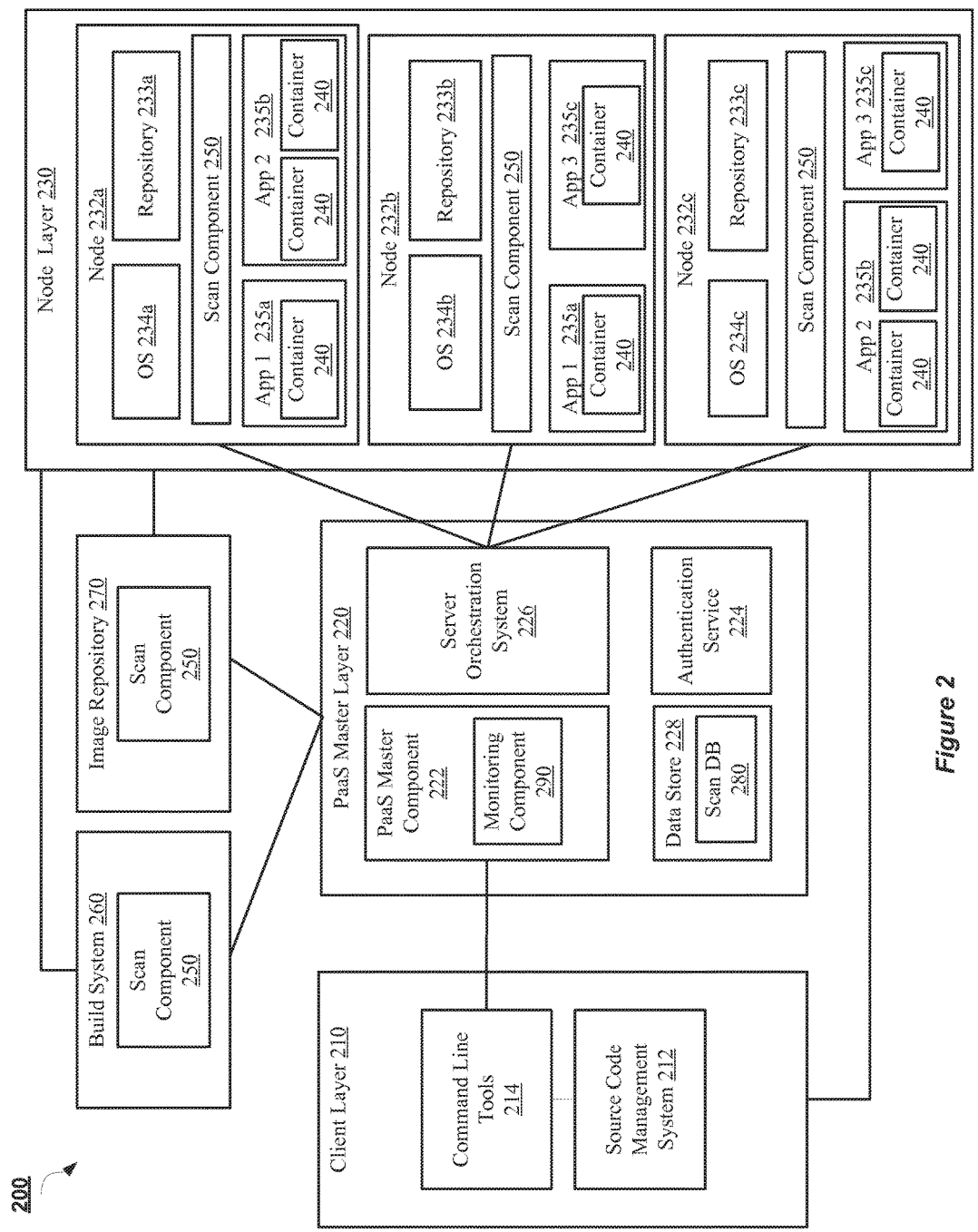
FIG. 2 is a block diagram of a multi-tenant Platform-as-a-Service (PaaS) system architecture according to an implementation of the disclosure.

FIG. 2 is a block diagram of a multi-tenant PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a PaaS master layer 220, and a node layer 230.

In one implementation, the components of the PaaS system architecture are in communication with each other via a network (not shown). The network may include, for example, the Internet in one implementation. In other implementations, other networks, wired and wireless, such as an intranet, local area network (LAN), wide area network (WAN), or broadcast network may be used.

In one implementation, the client layer 210 resides on a client machine, such as a workstation of a software developer, and provides an interface to a user of the client machine to the PaaS master layer 220 of the PaaS system 200. In one implementation, the client machine can be a client 160, 170, 180 described with respect to FIG. 1. The PaaS master layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Another example of an SCM or revision control system is Mercurial, also available as open source software. Git, Mercurial, and other such distributed SCM systems typically include a working directory for making changes, and a local software repository for storing the changes for each application associated with the end user of the PaaS system 200. The packaged software application can then be "pushed" from the local SCM repository to a remote SCM repository, such as repositories 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 expose an application programming interface ("API") of the PaaS master layer 220 and perform other applications management tasks in an automated fashion using other interfaces, as will be described in more detail further below in accordance with some implementations.

In one implementation, the PaaS master layer 220 acts as middleware between the client layer 210 and the node layer 230. The node layer 230 includes the nodes 232a-c on which applications 235a-c are provisioned and executed. In one implementation, each node 232a-c is a VM. In some implementations, the VMs are provisioned by an Infrastructure as a Service (IaaS) provider. In other implementations, the nodes 232a-c may be physical machines or VMs residing on a single physical machine. In one implementation, the PaaS master layer 220 is implemented on one or more machines, such as server computers, desktop computers, etc. In some implementations, the PaaS master layer 220 may be implemented on one or more machines separate from machines implementing each of the client layer 210 and the node layer 230, or may be implemented together with the client layer 210 and/or the node layer 230 on one or more machines, or some combination of the above.

In one implementation, the PaaS master layer 220 includes a PaaS master component 222 that coordinates requests from the client layer 210 with actions to be performed at the node layer 230. Examples of the requests can include a request to create an application, a request to perform an action on a container (e.g., creating, removing, and/or managing a container), a request to deploy source code of an application, a request to designate a system to host a remote SCM repository (e.g., an indication that a system has been designated by a user to host a remote SCM repository), etc.

In one implementation, a user, using the command line tools 214 at client layer 210, can request the creation of a new application 235a-c, deployment of source code of the application 235a-c, the designation of a system that hosts a remote SCM repository, etc. In response to receiving such a request, the PaaS master component 222 may first authenticate the user using an authentication service 224. In one implementation, the authentication service 224 may comprise custom authentication methods, or standard protocols such as SAML, Oauth, etc. Once the user has been authenticated and allowed access to the system by authentication service 224, the PaaS master component 222 uses a server orchestration system 226 to collect information and configuration information about the nodes 232a-c.

In one implementation, the PaaS master component 222 uses the ETCD™ service available from CoreOS™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the PaaS master component 222 manages the business logic and model representing the nodes 232a-c and the applications 235a-c residing on the nodes, and acts as a controller that generates the actions requested by users via an API of the command line tools 214. The server orchestration system 226 then takes the actions generated by the PaaS master component 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud-based storage service provided by a Software-as-a-Service (SaaS) provider. The PaaS master component 222 uses the information about the nodes 232a-c and their applications 235a-c to model the application hosting service and to maintain records about the nodes. In one implementation, data of a node 232a-c is stored in the form of a JavaScript™ Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 that is hosting the first customer's deployed applications 235a-c. In some implementations, portions of an application execute on multiple different nodes 232a-c. For example, as shown in FIG. 2, components of application 1 235a run in both node 232a and node 232b. Similarly, components of application 2 235b may run in node 232a and node 232c, while components of application 3 235c may run in node 232b and 232c.

In one implementation, each node 232a-c is implemented as a VM and has an operating system 234a-c that can execute applications 235a-c using the repositories 233a-c that are resident on the nodes 232a-c. Each node 232a-c also includes a server orchestration system agent (not shown) configured to track and collect information about the node 232a-c and to perform management actions on the node 232a-c. The server orchestration system agent may operate in tandem with the server orchestration system 226 to send requests, queries, and commands between the node 232a-c and the PaaS master layer 220.

As discussed above, node 232a-c runs multiple applications 235a-c. A node 232a-c runs an application by launching an instance of an application image as a container 240 in the node 232a-c. An application image includes the underlying support software that implements the functionality of applications 235a-c. An application image for an application may be built by build system 260, which may be separate from or part of node layer 230. Build system 260 may be the same as image build system 190 described with respect to FIG. 1.

As discussed above, build system 260 may generate an application image from a combination of preexisting ready-to-run application images related to core functionality of the application and source code provided by a user of the application. For example, the preexisting ready-to-run application images may include support software providing functionality (e.g., configuration templates, scripts, dependencies, etc.) used to run the application 235a-c and/or add a feature to the application 235a-c. For example, the images may support languages such as, but not limited to, Java™, PHP, Ruby, Python, Perl, and so on. In addition, application images may be generated that support databases, such as MySQL™, PostgreSQL™, Mongo™, and others. Preexisting ready-to-run application images may also include those that support the build and continuous integration environments, such as a Jenkins-based image. Lastly, preexisting ready-to-run application images may be used to support management capabilities and/or tools, such as PHPmyadmin, RockMongo™, 10gen-mms-agent, cron scheduler, HAProxy, Maven, and Gradle, for example.

Each application image built by build system 260 may map to a functional component of the application 235a-c. As such, an application may have more than one application image associated with the application. Built application images may be pushed to image repository 270 for storage and accessibility for subsequent use in launching instances of the application images at containers 240 in nodes 232a-c. Image repository 270 may be the same image repository 106 described with respect to FIG. 1.

A container 240 is a resource-constrained process space on the node 232a-c to execute functionality of an application 235a-c. In some implementations, a container 240 is established by the node 232a-c with resource boundaries, including a limit and/or designation of the amount of memory, amount of storage, and security types and/or labels to be applied to any functions executed by the container 240. In one implementation, containers 240 may be established using the Linux Containers (LXC) method. In further implementations, containers 240 may also be established using cgroups, SELinux™, and kernel namespaces, to name a few examples.

Application image instances for an application 235a-c may be launched in containers 240 dispersed over more than one node 232a-c. In other implementations, application image instances for an application 235a-c may run in one or more containers 240 on the same node 232a-c. Furthermore, an application 235a-c may use more than one application image 240 as part of providing functionality for the application 235a-c. One example of this is a JavaEE™ application that uses a JBoss™ application server-based application image with a supporting MySQL™ database provided by a MySQL™-based application image.

In one implementation, multiple scan components 250 are located at nodes 232a-c, image build system 260, and image repository 270. Scan components 250 may be the same as scan component 150 described with respect to FIG. 1. Each scan component 250 may include one or more pluggable scanning processes (e.g., clamav, rkhunter, malware finder, etc.) installed to provide pattern detection in order to identify threats (e.g., viruses, malware, other unwanted processes, etc.) existing in the PaaS system 200. Implementations of the disclosure optimize scanning by scan components 250 of images and runtime environments of applications of the PaaS system 200.

Multiple scan components 250 are distributed throughout the PaaS system to provide for separate build-time, runtime and image repository scans. The multiple scan components 250 are optimized to take advantage of the image-based model for application deployment utilized by the PaaS. Full application image scans may be performed by a scan component 250 residing at the image build system 260. Each time an application image is built by build system 260, scan component 250 analyzes the output of the build to determine whether the application image is clean. For example, the scan component 250 may run pattern detection according to a definition file configured at the scan component 250 on each layer of the built application image.

A result of the built application image scan process is stored in a central scan database 280 maintained by the PaaS master layer 220, for example in data store 228. Central scan database 280 may be the same as central scan data store 145 described with respect to FIG. 1. In one implementation, the information maintained in central scan database 280 includes, but is not limited to, a unique identifier of the layer of the image being scanned (e.g., a checksum of the layer), the scan process (e.g., clamav, rkhunter, etc.), a definition version of the scan process run against the image layer, and a result of the scan (e.g., clean, failed, etc.).

In some implementations, the scan component 250 at the build system 260 may utilize previous scan results to streamline the scan process of a built application image by skipping a scan of the layers of the built application image that have already been scanned in previous scans (as documented in the central scan database 280). For example, previous scans of the application image layers corresponding to the previously-existing ready-to-run application images used to build the new application image may be used to skip the scan process for those layers in the newly built image. In one implementation, a "diff" process may be utilized between the previously-existing ready-to-run image and the newly-built image in order to identify the differences that should be scanned by scan component 250.

In one implementation, if an application image layer fails the scan process (e.g., a defined pattern is detected by the scan component 250), then the scan component 250 alerts a monitoring component 290 of the PaaS master component 222. The monitoring component 290 may begin a takedown process to remove the application image from the PaaS system.

When new scan definitions are released, a scan component 250 residing in the image repository 270 scans all existing application images and updates central scan database 280 with the scan results. If a pattern is detected in any of the application images maintained at image repository 270, then the scan component provides a list of images affected by the failed scan to the monitoring component 290. The monitoring component 290 then determines which running containers 240 include any of the images in the list, and initiates a takedown process for those containers 240 as well as the affected images in the image repository 270.

Scan components 250 at each of nodes 232a-c are configured to scan the running (e.g., top-most) layer of each application image instance on containers 240 of the node 232a-c, while ignoring all other layers of the application image. Each application image includes multiple layers of files, with the top-most layer of an application image instance running as a container 240 being configurable, while the remaining lower layers are immutable or unchangeable. As a result of running a scan of the built application image at build-time as described above, the lower layer of an application image instance running on a node 232a-c is assumed to be clean in terms of scanning. Consequently, the scan components 250 at nodes 232a-c scan just the top-most configurable layer of running application components on the node 232a-c, thus saving resources in the PaaS system that were previously consumed in running full image scans at the nodes 232a-c. The scan components 250 at each node may be configured to run on an iterative time period (e.g., once a day, etc.) to examine all running containers 240 on the node.

Figure 3:
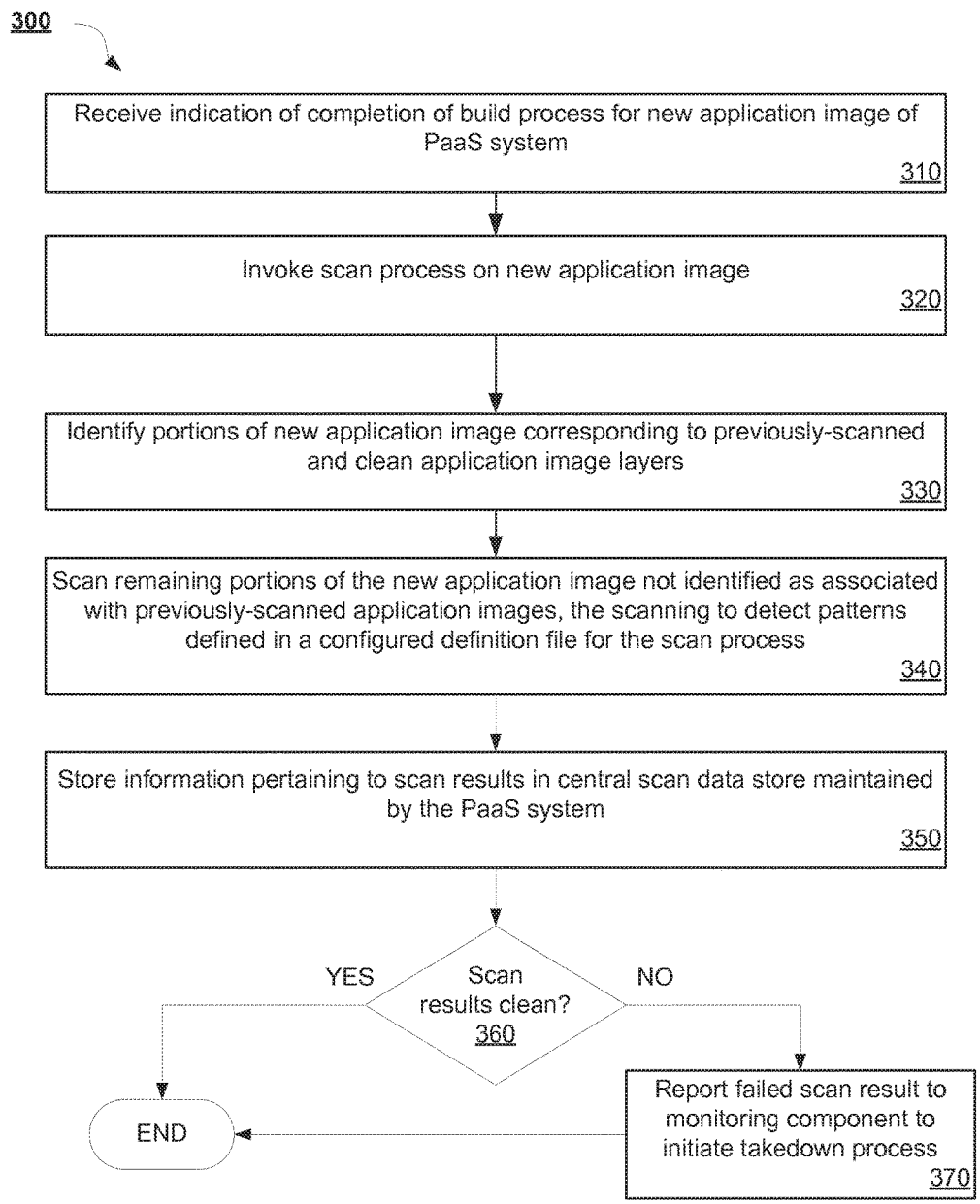
FIG. 3 is a flow diagram illustrating a method for build-time image scanning in a multi-tenant PaaS system according to an implementation of the disclosure.

FIG. 3 is a flow diagram illustrating a method 300 for build-time image scanning in a multi-tenant PaaS system according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by scan component 250 of build system 260 of FIG. 2.

Method 300 begins at block 310 where an indication of a completion of a build process for a new application image is received. Then, at block 320, a scan process is invoked on the new application image. At block 330, the portions of the new application image corresponding to previously-scanned and clean application image layers are identified. In one implementation, the previously-scanned and clean application image layers may correspond to core functionality base image(s) of the PaaS system used to build the application in combination with source code provided by an owner of the application. A central scan data store of the PaaS system may include information indicating which application images have been scanned with a clean result.

At block 340, the remaining portions of the new application image that are not part of the identified portions are scanned. In some implementations, a diff process between the previously-scanned and clean application images and the new application image may be used to determine the remaining portions of the new application image for scanning. The scanning process may detect patterns in the remaining portions of the new application image that are defined in a configured definition file for the scan process.

At block 350, information pertaining to the scan results is stored in a central scan data store maintained by the PaaS system. In one implementation, the information may include, but is not limited to, a unique ID for the application image layer scanned (e.g., a checksum of the application layer), a scan process run against the application image layer, a definition file version run against the application image layer, and result of the scan (e.g., clean, failed, etc.). At decision block 360, it is determined whether the scan results were clean. If so, method 300 ends. On the other hand, if the scan results failed, then method 300 continues to block 370 where the failed scan results are reported to a monitoring component of the PaaS system in order to initiate a takedown process for the new application image. Then method 300 ends.

Figure 4:
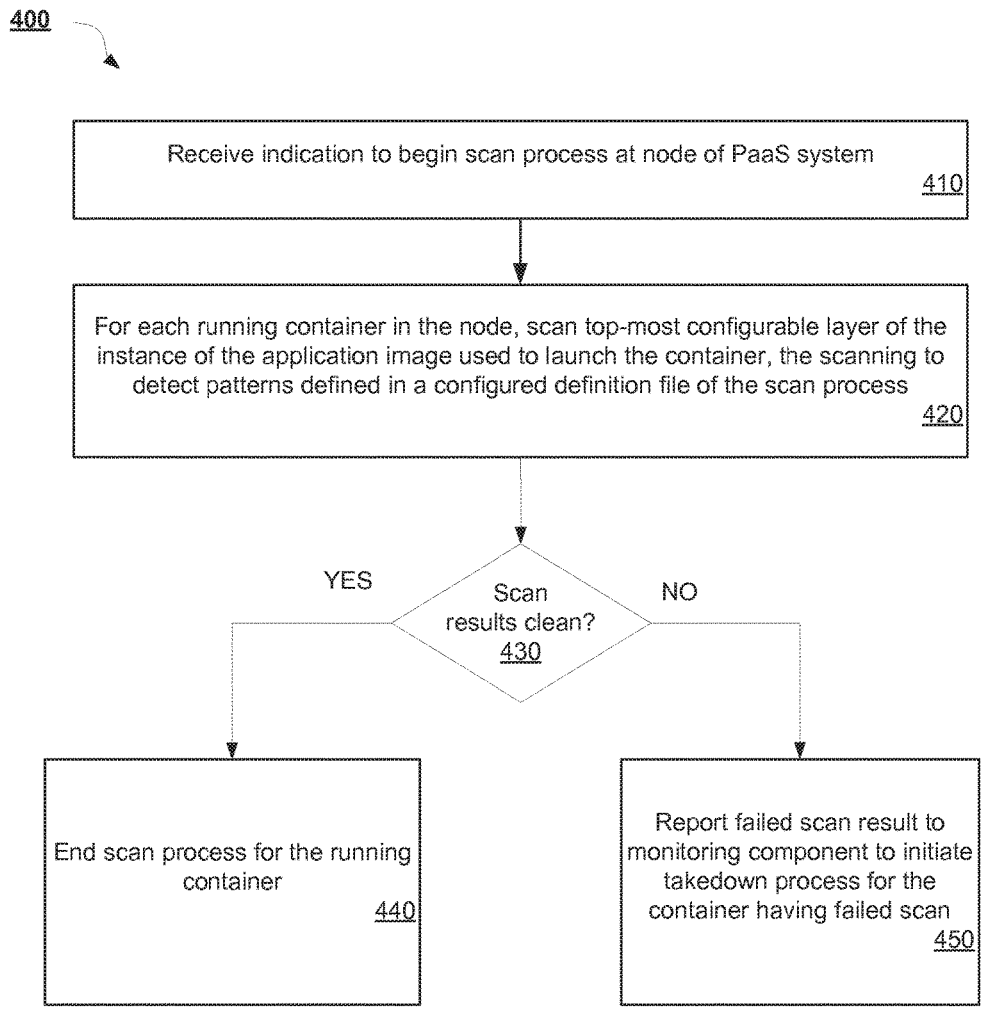
FIG. 4 is a flow diagram illustrating a method for runtime container and image scanning in a multi-tenant PaaS system according to an implementation of the disclosure.

FIG. 4 is a flow diagram illustrating a method 400 for runtime container and image scanning in a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by scan component 250 of nodes 232a-c of FIG. 2.

Method 400 begins at block 410 where an indication is received to begin a scan process at a node of the PaaS system. In one implementation, the scan process is configured to run on the node on a recurring and iterative basis (e.g., once a day, etc.). At block 420, for each running container on the node, a top-most configurable layer of an instance of the application image used to launch the container is scanned. The scanning process may detect patterns in the remaining portions of the new application image that are defined in a configured definition file for the scan process.

At decision block 430, it is determined whether the scan results are clean. If so, then at block 440, the scan process for each of the running containers with clean scans is terminated. On the other hand, if the scan results failed at decision block 430, then at block 450 the failed scan results are reported to a monitoring component of the PaaS system. The monitoring component may then initiate a takedown process for any of the containers with failed scan results.

Figure 5:
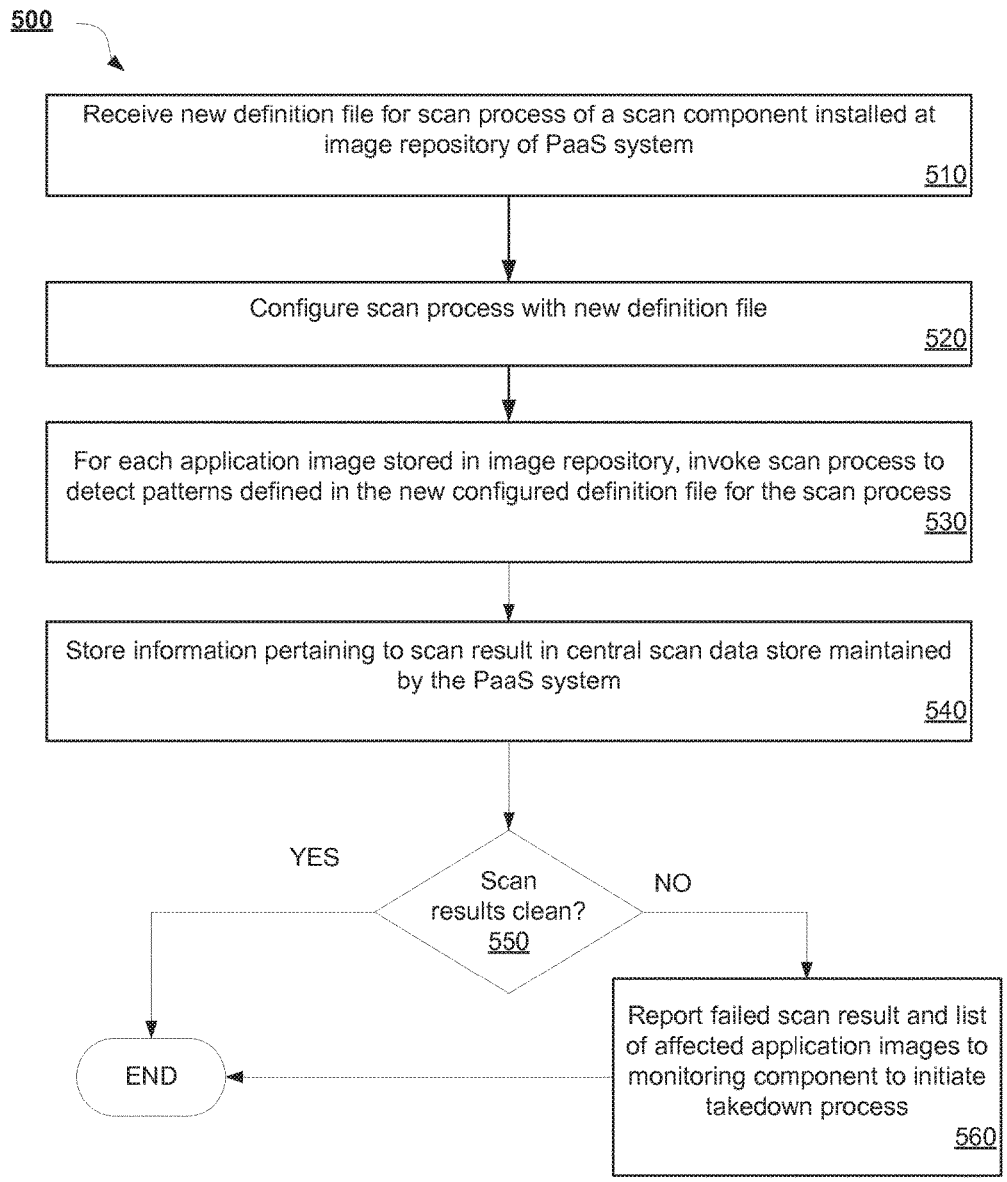
FIG. 5 is a flow diagram illustrating a method for re-scanning application images in a multi-tenant PaaS system according to an implementation of the disclosure.

FIG. 5 is a flow diagram illustrating a method 500 for re-scanning application images in a multi-tenant PaaS system according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one implementation, method 500 is performed by scan component 250 of image repository 270 of FIG. 2.

Method 500 begins at block 510 where a new definition file is received for a scan process of a scan component installed at an image repository of a PaaS system. At block 520, the scan process is configured with the new definition file. Then, at block 530, the scan process is invoked for each application image stored in the image repository. In one implementation, the invoked scan process detects patterns defined in the new configured definition file for the scan process.

At block 540, information pertaining to the scan results is stored in a central scan data store maintained by the PaaS system. In one implementation, the information may include, but is not limited to, a unique ID for the application image layer scanned (e.g., a checksum of the application layer), a scan process run against the application image layer, a definition file version run against the application image layer, and result of the scan (e.g., clean, failed, etc.).

Then, at decision block 550, it is determined whether the scan results are clean. If so, method 500 ends. Other the other hand, if the scan results failed, then method 500 continues to block 560 where the failed scan results and a list of affected application images are reported to a monitoring component of the PaaS system. In one implementation, the monitoring component uses the reporting information to identify running containers utilizing the affected application images and to initiate a takedown process for the running containers at their nodes. In addition, the monitoring component initiates a takedown process for the affected application images themselves. Then, method 500 ends.

Figure 6:
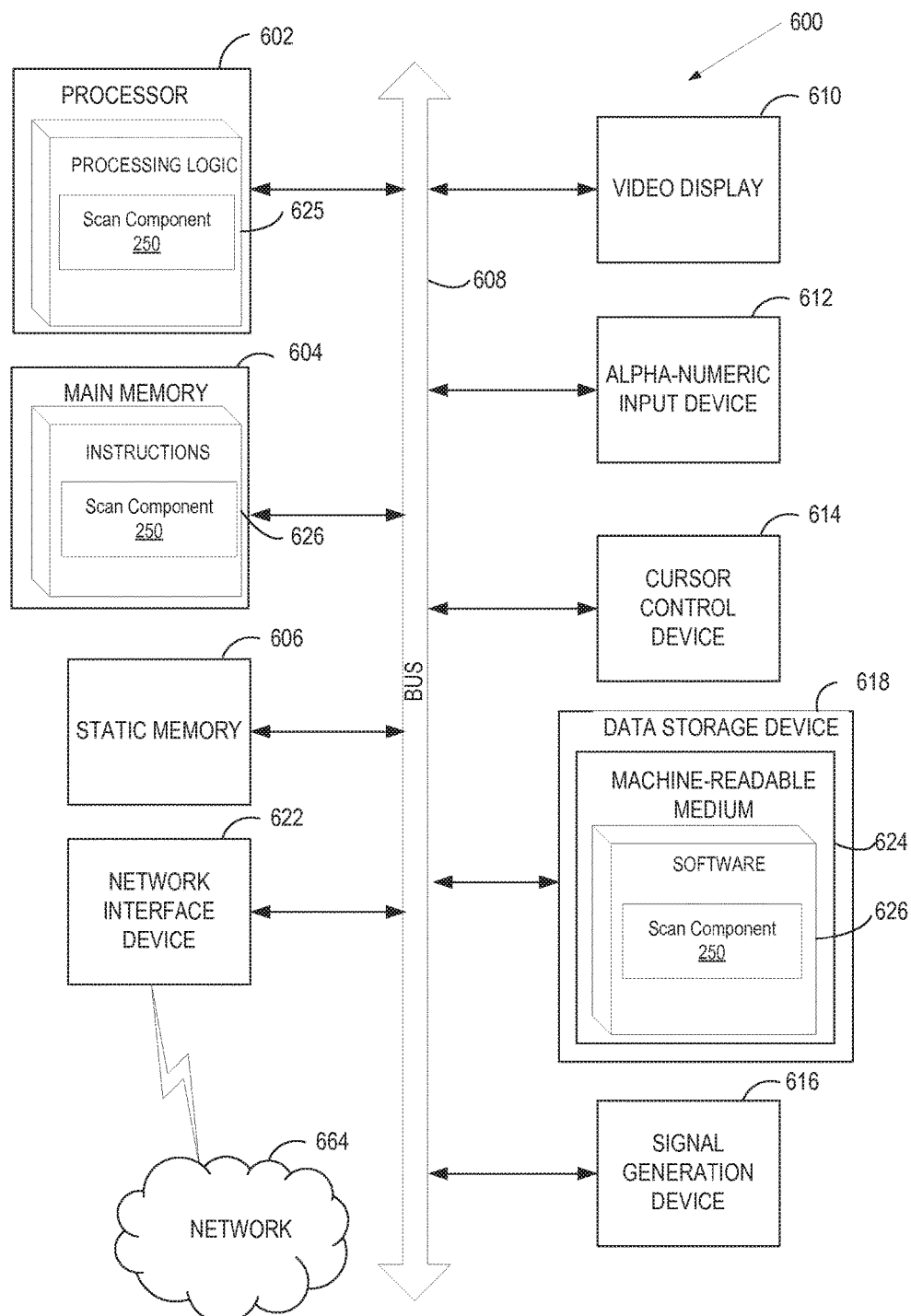
FIG. 6 illustrates a block diagram of one implementation of a computer system.

FIG. 6 illustrates a diagrammatic representation of a machine in the example form of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 608.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 625 for performing the operations and steps discussed herein.

The computer system 600 may further include a network interface device 622 communicably coupled to a network 664. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable (or machine-accessible) storage medium 624 on which is stored software 626 embodying any one or more of the methodologies of functions described herein. The software 626 may also reside, completely or at least partially, within the main memory 604 as instructions 626 and/or within the processing device 602 as processing logic 625 during execution thereof by the computer system 600; the main memory 604 and the processing device 602 also constituting machine-readable storage media.

The machine-readable storage medium 624 may also be used to store instructions 626 to implement a scan component 250 to provide image and container scanning for a PaaS system in a computer system, such as the computer system described with respect to FIG. 1, and/or a software library containing methods that call the above applications. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing, encoding or carrying a set of instruction for execution by the machine and that cause the machine to perform any one or more of the methodologies of the disclosure. The term "machine-readable storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "initiating", "scanning", "terminating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    storing at a central scan store of a multi-tenant system, an image scan result for a container image, the container image for executing functionality of multiple applications and comprising multiple layers, wherein the image scan result generated by a scan process at a first processing device, the scan process comprising:
        scanning, by the first processing device, a top layer of the container image, wherein the remaining layers of the container image are immutable;
        verifying, by the first processing device, a clean status of the remaining layers of the container image with the central scan store; and
        transmitting, by the first processing device, the image scan result for the container image, the image scan result being clean in response to both of a clean result returned for the scanning and successful verification of the clean status of the remaining layers; and
    responsive to receiving a container image scan result request from a second processing device for the container image, transmitting the image scan result for the container image to the second processing device.

2. The method of claim 1, wherein the container image to provide the functionality for the multiple applications on nodes of the multi-tenant system.

3. The method of claim 1, wherein the scanning to detect patterns defined by a definition file of the scan process.

4. The method of claim 3, wherein the clean result comprises no patterns detected in the top layer of the container image.

5. The method of claim 3, further comprising in response to detecting one of the patterns in the top layer of the container image, transmitting a takedown signal to one or more nodes executing instances of the container image.

6. The method of claim 1, further comprising in response to an absence of a clean status for at least one of the remaining layers in the central scan store:
    repeating the scanning for each of the at least one of the remaining layers; and
    storing a result of the scanning for each of the at least one of the remaining layers in the central scan store.

7. The method of claim 1, wherein the image scan result comprises at least an identifier comprising a checksum of the scanned layer of the container image, an identification of the scan process, a version of a definition file used by the scan process, and a result of the scan process.

8. The method of claim 1, further comprising receiving, at the central scan store, at least one of other image scan results or communications from computing devices managed by entities external to the multi-tenant system.

9. A method comprising:
    maintaining container images for a plurality of applications, the container images for executing functionality of the plurality of applications and comprising multiple layers, each layer of each container image corresponding to a clean scan result generated by a scan process at a first processing device, the scan process comprising:

scanning, by the first processing device, a top layer of the container image, wherein the remaining layers of the container image are immutable;

verifying, by the first processing device, a clean status of the remaining layers of the container image with a central scan store; and transmitting, by the first processing device, the image scan result for the container image to the central scan store, the image scan result being clean in response to both of a clean result returned for the scanning and successfully verifying the clean status of the remaining layers; and responsive to receiving a request for one of the container images from a second processing device, transmitting the requested container image to the second processing device.

10. The method of claim 9, wherein the first processing device performs the scan process on each maintained container image in response to receiving a new definition file for the scan process.

11. The method of claim 9, wherein transmitting the requested contained image further comprises transmitting the image scan result for the container image.

12. A system comprising:

a memory;

a processing device communicably coupled to the memory, the processing device to:

store at a central scan store of a multi-tenant system, an image scan result for a container image, the container image for executing functionality of multiple applications and comprising multiple layers, wherein the image scan result generated by a scan process at a processing device, the scan process comprising the processing device to:

scan a top layer of the container image, wherein the remaining layers of the container image are immutable;

verify a clean status of the remaining layers of the container image with the central scan store; and transmit the image scan result for the container image, the image scan result being clean in response to both of a clean result returned for the scanning and successful verification of the clean status of the remaining layers; and responsive to receiving a container image scan result request for the container image, transmit the image scan result for the container image to an originator of the request.

13. The system of claim 12, wherein the container image to provide the functionality for the multiple applications on nodes of the multi-tenant system.

14. The system of claim 12, wherein the processing device to scan the top layer causes the processing device to detect patterns defined by a definition file of the scan process.

15. The system of claim 14, wherein the clean result comprises no patterns detected in the top layer of the container image.

16. The system of claim 14, wherein the processing devices is further to, in response to detecting one of the patterns in the top layer of the container image, transmit a takedown signal to one or more nodes executing instances of the container image.

17. A non-transitory machine-readable storage medium including instructions that, when accessed by a processing device, cause the processing device to:

maintain container images for a plurality of applications, the container images for executing functionality of the plurality of applications and comprising multiple layers, each layer of each container image corresponding to a clean scan result generated by a scan process at a first processing device, the scan process comprising:

scanning, by the first processing device, a top layer of the container image, wherein the remaining layers of the container image are immutable;

verifying, by the first processing device, a clean status of the remaining layers of the container image with a central scan store; and transmitting, by the first processing device, the image scan result for the container image to the central scan store, the image scan result being clean in response to both of a clean result returned for the scanning and successfully verifying the clean status of the remaining layers; and responsive to receiving a request for one of the container images from a second processing device, transmit the requested container image to the second processing device.

18. The non-transitory machine-readable storage medium of claim 17, wherein the first processing device performs the scan process on each maintained container image in response to receiving a new definition file for the scan process.

19. The non-transitory machine-readable storage medium of claim 17, wherein transmitting the requested contained image further comprises transmitting the image scan result for the container image.

20. The non-transitory machine-readable storage medium of claim 17, wherein the container image to provide the functionality for the multiple applications on nodes of the multi-tenant system.

* * * * *